United States Patent
Hon et al.

(10) Patent No.: US 7,933,956 B2
(45) Date of Patent: Apr. 26, 2011

(54) SYSTEM AND METHOD TO CREATE A COLLABORATIVE WEB-BASED MULTIMEDIA LAYERED PLATFORM

(75) Inventors: Henry Hon, Berkeley, CA (US); Christopher Anthony Peri, Oakland, CA (US); Timothy Hon, Berkeley, CA (US); Frankie Waitim Wong, Pullman, WA (US)

(73) Assignee: Simulat, Inc., Berkeley, CA (US)

( * ) Notice: Subject to any disclaimer, the term of this patent is extended or adjusted under 35 U.S.C. 154(b) by 518 days.

(21) Appl. No.: 11/657,787

(22) Filed: Jan. 24, 2007

(65) Prior Publication Data
US 2007/0198534 A1 Aug. 23, 2007

Related U.S. Application Data

(60) Provisional application No. 60/761,529, filed on Jan. 24, 2006.

(51) Int. Cl.
*G06F 15/16* (2006.01)
(52) U.S. Cl. .................................. 709/205; 709/246
(58) Field of Classification Search .............. 709/205, 709/224, 231, 236, 246; 707/10
See application file for complete search history.

(56) References Cited

U.S. PATENT DOCUMENTS

| | | | |
|---|---|---|---|
| 4,939,509 A | 7/1990 | Bartholomew et al. | |
| 5,107,443 A | 4/1992 | Smith et al. | |
| 5,742,283 A * | 4/1998 | Kim | 715/201 |
| 5,889,946 A | 3/1999 | FitzPatrick et al. | |
| 6,061,717 A | 5/2000 | Carleton et al. | |
| 6,204,840 B1 * | 3/2001 | Petelycky et al. | 715/202 |
| 7,149,959 B1 * | 12/2006 | Jones et al. | 715/234 |
| 7,237,002 B1 * | 6/2007 | Estrada et al. | 709/203 |
| 7,296,285 B1 * | 11/2007 | Jun et al. | 725/46 |
| 2002/0129106 A1 * | 9/2002 | Gutfreund | 709/205 |
| 2007/0055928 A1 * | 3/2007 | Pery et al. | 715/514 |

* cited by examiner

*Primary Examiner* — William C Vaughn, Jr.
*Assistant Examiner* — Mohamed Ibrahim

(57) ABSTRACT

The present invention relates to a system and method to allow multiple users to collaborate on tasks and interact in a shared space session within a network in real-time; using a media application to manage media-layers. Each media-layer serves as a container for multimedia programs or plug-ins. The invention allows which media-layer to display via organization metaphors and filtering criteria. When multiple users are logged into the same shared space, each user can invoke and observe modifications to media-layers with the browser based or client based application. All events are synchronized among all users in that shared space, where the system is a communication conduit. The media-layers in the shared space maintains spatial and temporal correlation by a media application stage manager tool and described as a collection file descriptor such as an XML file. The ability to invoke events that affect media-layers can be supported in a synched or non synched mode on demand.

26 Claims, 13 Drawing Sheets

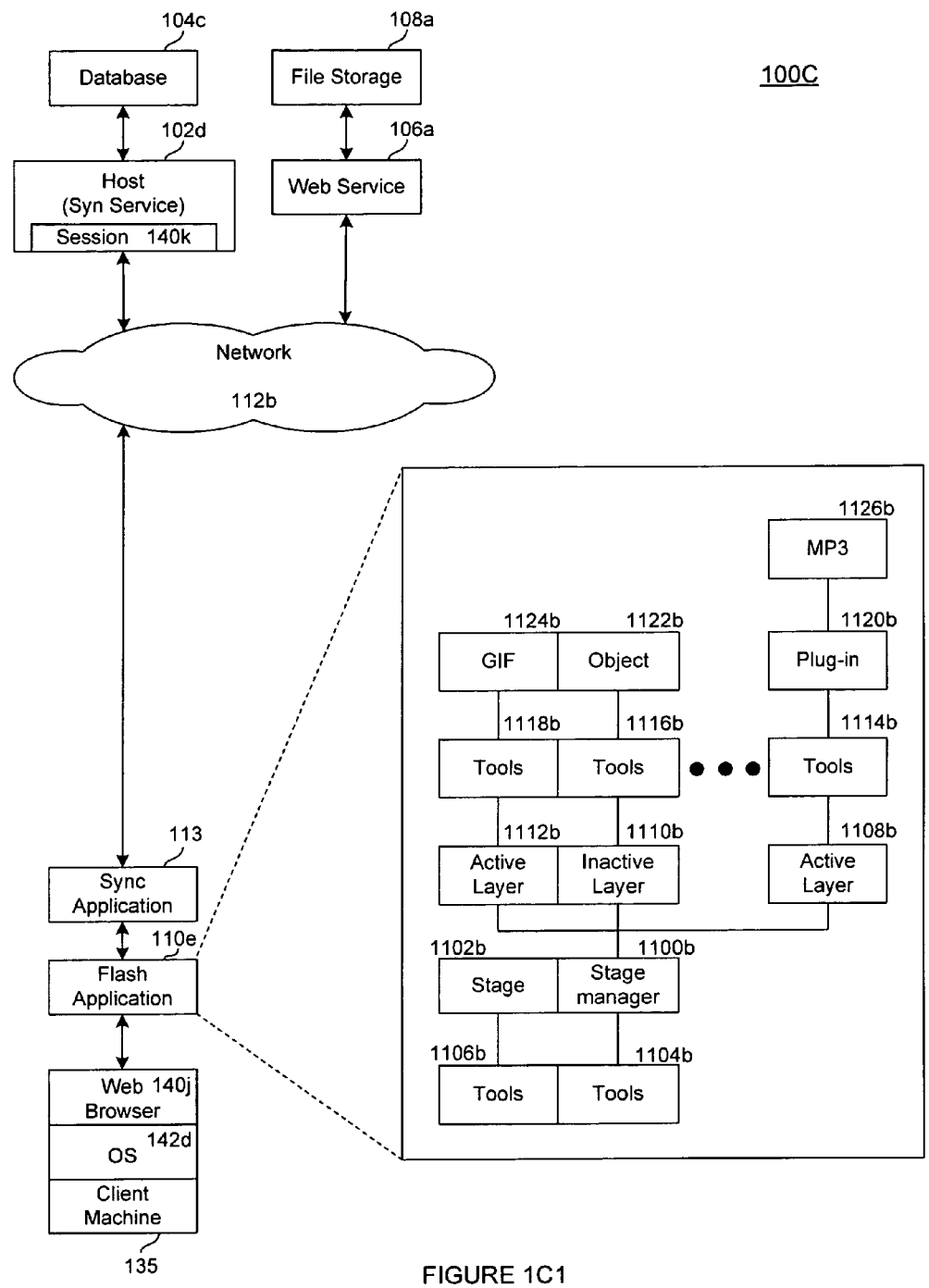
FIGURE 1C1

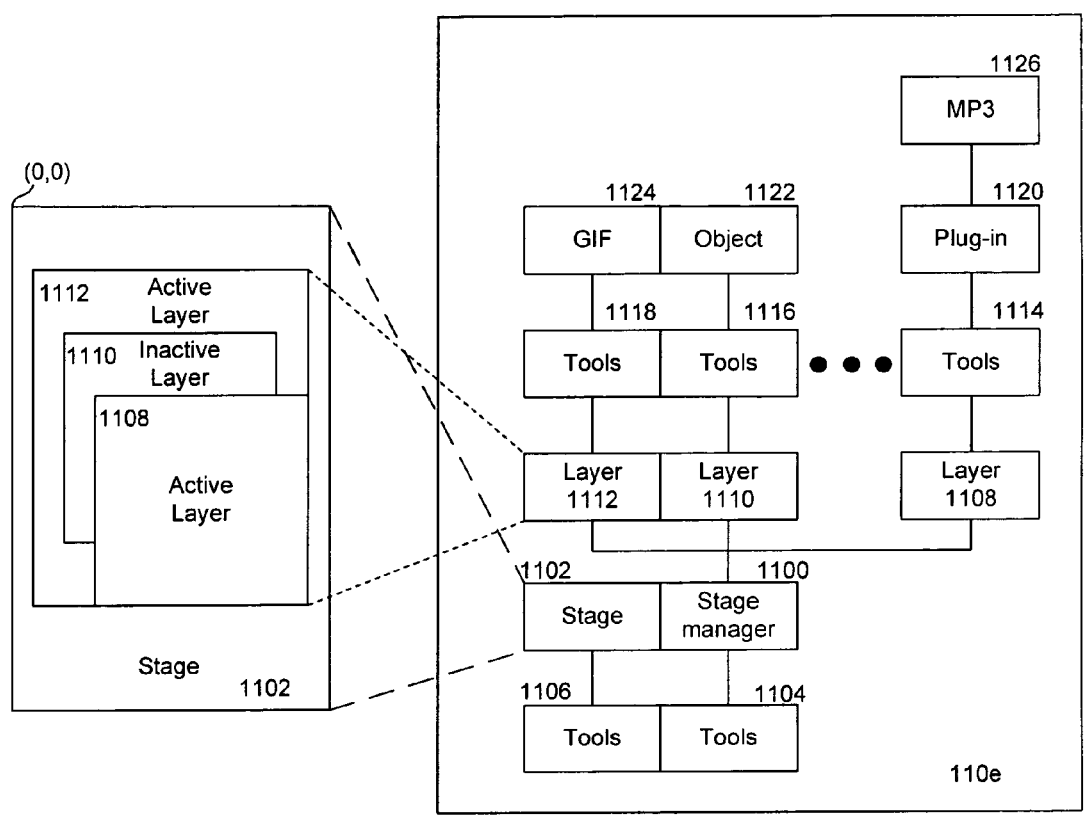
FIGURE 1C2

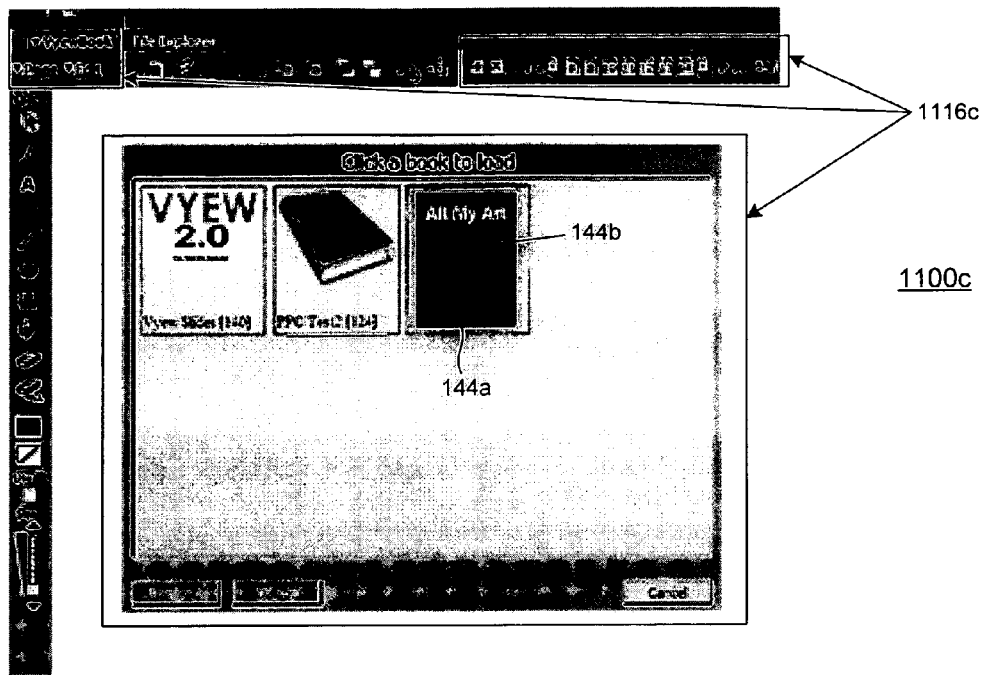
Fig 1F
Fig 1F1

SYSTEM AND METHOD TO CREATE A COLLABORATIVE WEB-BASED MULTIMEDIA LAYERED PLATFORM

BACKGROUND OF THE INVENTION

This application claims the priority benefit of U.S. Provisional Application No. 60/761529, A System And Method To Create A Collaborative Web-Based Multimedia Layered Platform, filed on Jan. 24, 2006.

In the last few years, there has been an explosion in new forms of web based communication within a shared space. The synchronous form is most commonly practiced as Online Chat. With synchronous communication, like Online Chat for example, text is exchanged in real-time between participants. Although images can be provided to a limited extent, links to images or other multimedia is more commonly used. Another common form of synchronous communication is with web conferencing services. These services provide a discrete state synchronicity such that only one image can be shared at one time. Typically, once the session has ended, the images shared are lost. Many of the current online collaboration systems are beginning to record the sessions. However, these recording are only recoding a series of images for play back.

The most common asynchronous forms of collaboration are Forums, blogs and WIKIs. In the asynchronous case, visitors can upload text or images so that all subsequent visitors can browse and see the text or images. Blogs and Forums have an advantage over Chat in that conversations can be linked into 'threads'. This allows the user to follow a set of contributions in a linear and/or nested fashion. Lacking is the real-time aspect as well as the ability to layer media. Currently even if you can upload an image or multimedia clip into a chat room or blog, it is not known for visitors to alter, manipulate or annotate over the original posting. What is common to these forms of shared communication is that they are linear. All information whether text or image, is accessed in order. A comment in a blog about an image does not appear on top of the image, but instead next to it as with 'threads'. The same holds true for a chat box. Users must cut and paste to refer to a past event.

Lacking is a system that will allow both synchronous and asynchronous communication using discrete media layers such that information can be organized by time and space which in turn can allow for a variety of organizational metaphors.

It will be desirable that multiple users are able to interact with one another and perform a plurality of multimedia tasks in a virtual and synchronized shared environment; or to be able to access and review the performed tasks from local or remote sources at will in any order. It will also be desirable to allow users to set control or restrict the viewing of media layers in the same shared environment through different filtering algorithms. It is also desirable that an original image can seemed to be altered or manipulated by overlaying various media-layers together.

The following terminologies used in the application are selectively defined by an online dictionary such as Wikipedia to help understanding:

Web based shared space—This describes a single point of reference for multiple users to access and add and modify information from a web browser for viewing by others via that same point of reference.

Media (multi)—Multimedia is the use of several different media to convey information (text, audio, graphics, animation, video, and interactivity).

Medium—defined as the singular of multimedia. For example, text, a media, is a singular example of multimedia.

API—An application programming interface (API) is the interface that a computer system or application provides in order to allow requests for service to be made of it by other computer programs, and/or to allow data to be exchanged between them.

Plug-in—A plug-in is a computer program that can, or must, interact with another program to provide a certain, usually very specific, function. Typical examples are plug-in to display specific graphic formats (e.g., SVG if the browser doesn't support this format natively), to play multimedia files, to encrypt/decrypt email (e.g., PGP), or to filter images in graphic programs. The main program (a web browser or an email client, for example) provides a way for plug-in to register themselves with the program, and a protocol by which data is exchanged with plug-in. Plug-ins are slightly different from extensions, which modify or add to existing functionality. The main difference is that plug-in generally run within a sandbox, rely on the main program's user interface, and have a well-defined boundary to their possible set of actions.

Media-layer (media layer) (layer)—A media-layer is defined as a container that supports the display and modification of media and plug-ins. Media-layers have meta information, or attributes, such as; author, time/date created, its parent media-container, a list of children media-containers, position within 3D space, stacking order relative to the parent media-layer, size, reference to media or a plug-in that is assigned to the media-layer, etc.

Images—defined as photographs, drawings (vector and raster), diagrams, etc.

Annotation—Extra information associated with a particular point in a document or other piece of information.

Common Web Browser—A web browser is a software application, technically a type of HTTP client, that enables a user to display and interact with HTML documents hosted by web servers or held in a file system. Popular browsers available for personal computers include Microsoft Internet Explorer®, Mozilla Firefox®, Opera®, Netscape®, Apple Safar®i and Konqueror®. A browser is the most commonly used kind of user agent. The largest networked collection of linked documents is known as the World Wide Web. It is assumed that all common web browser will have Macromedia Flash® installed or will support the installation and proper execution of Flash® applications.

Account Owner (creator)—The person who owns, creates or maintains or provided stewardship over a particular session and all options, rights relevant to that session.

Space Creator—The User creates an account to which a 'space' is allocated where other individuals also using a browser can engage in the synchronized or unsynchronized viewing and annotating of images.

Blog—A blog is a website in which journal entries are posted on a regular basis and displayed in reverse chronological order. The term blog is a shortened form of web log or web log. Authoring a blog, maintaining a blog or adding an article to an existing blog is called "blogging". Individual articles on a blog are called "blog posts," "posts" or "entries". A person who posts these entries is called a "blogger". A blog comprises hypertext, images, and links (to other WebPages and to video, audio and other files). Blogs use a conversational documentation style. Often blogs focus on a particular "area of interest", such as Washington, D.C.'s political goings-on. Some blogs discuss personal experiences.

Threads—Threads in a forum are either flat (posts are listed in chronological order) or threaded (each post is made in reply to a parent post). Sometimes, community members have a choice on how to display threads.

Online Chat—Online chat can refer to any kind of communication over the internet, but is primarily meant to refer to direct 1 on 1 chat or chat rooms, using tools such as instant messenger applications-computer programs, Internet Relay Chat, talkers and possibly MUDs, MUCKs, MUSHes and MOOes.

Room—A Room is a common reference to a 'shared space'. A room contains default tools, rules and permissions that are set and controlled by the room administrator.

Space—A shared virtual reference point where as multiple users can interact in real-time upon shared objects.

Stage—A reference coordinate system that informs where media should be displayed. The most typical stage is a two dimensional Cartesian coordinate system where 0,0 is position in the upper right of the display area.

Session State—The state of all objects, GUI tools and controls, and media-layers, at any given time.

Collection—One or more media-layers that have an organizational structure. Typically this is stored as an XML file.

Tools—GUI applications that affect the state of other tools and media-layers.

Tool: scene manager—specific GUI applications that affect the overall display of the stage.

Event—A set of codes that describe the modification of a media-layer.

WIKI—A website that allows the visitors themselves to easily add, remove, and otherwise edit and change available content, and typically without the need for registration.

Network—A computer network is two or more computers connected together using a telecommunication system for the purpose of communicating and sharing resources. Examples include but are not limited to a WAN or LAN connection or an internet, intranet or extranet connection.

SUMMARY OF THE INVENTION

The present invention, relates to the field of collaborative computing, and more particularly, to a system and method for providing a browser-based program to create, and configure a shared space whereby multiple users can access this shared space to perform tasks and interact such as input, modify text and delete images, drawings and other multimedia in a real-time synchronized manner. All media objects that are seen in this shared space are uniquely created and tracked such that they can be organized based on spatial, temporal and relational criteria. This is accomplished by placing each media object within a container called a media-layer. A shared space is defined as a virtual reference point whereas multiple users can interact in real-time upon shared objects. A shared space is a conceptual construct created by processing executable machine codes from a plurality of programs or plug-ins on each machine whereas actions initiated by one user is immediately observed by other users thus providing a sense of shared presence. A session is defined as the state of all objects, GUI tools and controls, and media-layers, at any given time within the shared space. Each media-layer can serve as a container for shapes and objects as well as other programs such as text editor, thumbnail viewer, MP3 player, games, etc. The invention also allows which media-layer to display via organization metaphors and filtering criteria.

When multiple users are logged into the same shared space as a session, each user can become an author to interact, observe and create new media layers with the application program as a plug-in that is native to their machine or downloaded. All media-layer events (transform, hide/unhide, copy, paste, delete, etc.) is synchronized among all users in that shared space, thus all media assigned to a media-layer will be synchronized through support plug-ins where the media-layer is a communication conduit. Media-layers in the shared spaces can be viewed in either a synchronized or unsynchronized mode on demand. A user will have their own respective collection of layers and thus each user can filter what layers to view using a variety of criteria including the media attributes. A collection is defined as references to one or more media-layers that have an organizational structure. Typically this is stored as an XML file. When multiple users are logged into the same shared space, each user can observe and interact with the collection of layers as well as creating new layers.

Persistence is an element of blogs and WIKI's providing the ability to retain previous versions of a media attributes as data structure to be retrieved after it is modified. In online chat or online conferencing, real-time communication is an element for direct instant messaging of text-based data. This invention advances a new paradigm in shared synchronized communication by combining both elements of persistence and real-time communication, with the addition of a third element not known to either blogs or online chat; the added dimensions of time and space through the use of discrete layers in a media container that can be stacked on top of the other, nested, hidden, unhidden and grouped in any desired relationship.

Direct annotation provides an added dimension to information creation and communication. By allowing a user to annotate over the original message, information can be understood not only by linear additions but as a whole. In addition, the annotation takes on a greater meaning precisely because of it's location in reference to the original media. This spatial temporal relationship is achieved by providing media-layers. Each media-layer contains a media element or object. All media-layers are organized and described by some relationship and/or dependency in hierarchy and how that organization is determined is by a metaphor. The metaphor is a means of organizing media-layers such that humans can better understand the relationship between objects and the meanings implied by that relationship. For example, one metaphor may be a book. In this case, all media-layers are further organized according to page numbers. Three media-layers my have the page value of '1'. Two other media-layers may have the page value of '2'. Additional tools that are native to or downloaded to the user's machine would then present the user with means of moving from page to page.

Those media-layers that are associated with the current 'page' are displayed. Others are hidden if they have already been loaded.

This functionality can be shared among concurrent and non-concurrent remote users creating a shared space where users can interact in real-time as well as create and alter information over time. This functionality is accessed by any of the known browser-based applications such as the Microsoft Explorer®, Firefox® or other web browsers mentioned in the definition list, thus does not require software installation. Said functionality can also be accessed if compliant codes are downloaded or have already been downloaded to the client machine.

BRIEF DESCRIPTION OF THE DRAWINGS

FIG. 1C1 is an embodiment of a system illustrating the process of establishing and operating a session within a user application such as a web browser using various tools in an application.

FIG. 1C2 illustrates another embodiment of various components of a Flash application tools interacting with the user's media-layers during a session.

FIGS. 1F and 1F1 illustrate the construct and functionality of a Book metaphor and a page using media-layers and metaphor specific tools.

DETAILED DESCRIPTION OF THE PREFERRED EMBODIMENTS

Figure 1A:
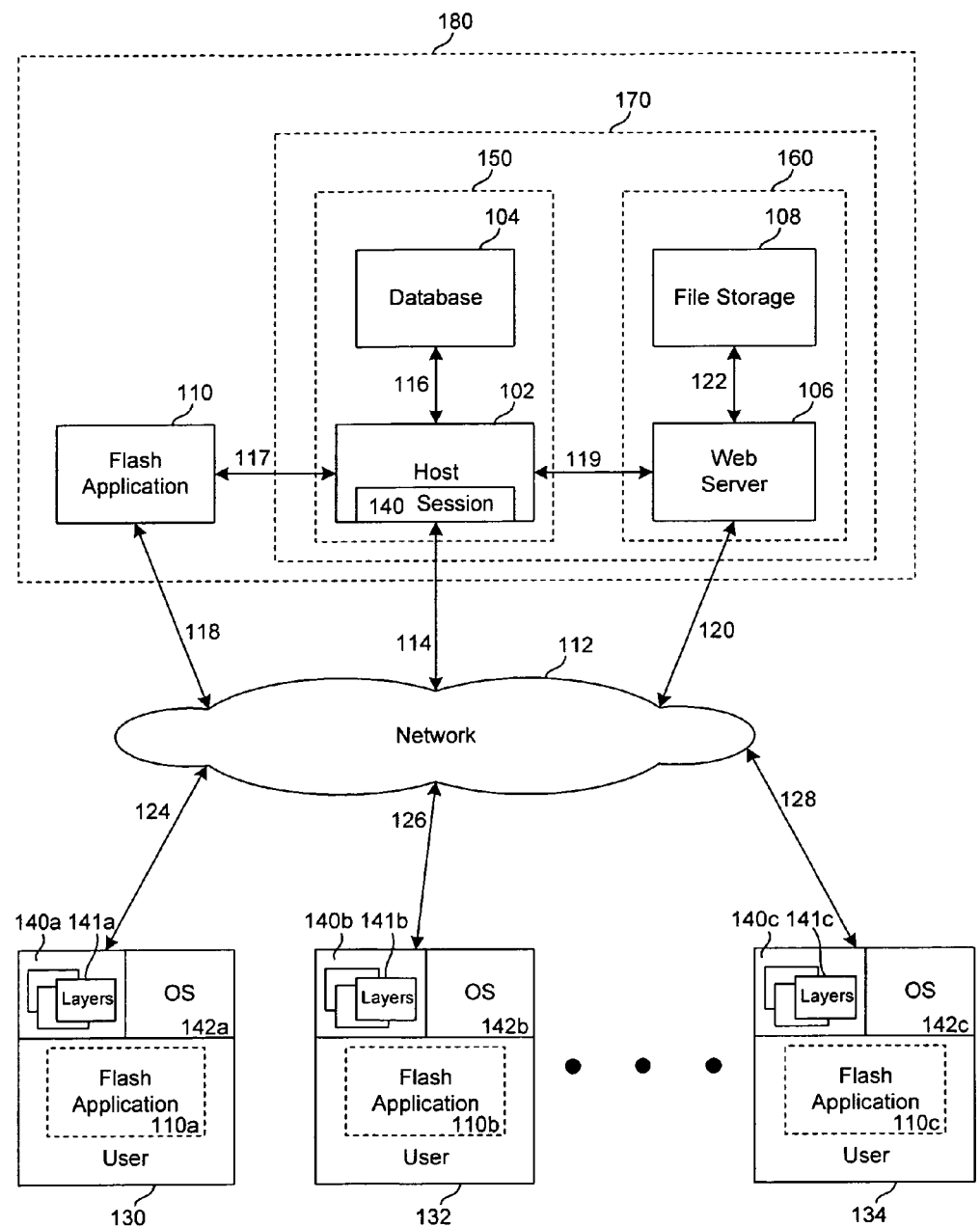
FIG. 1A depicts the embodiments of a system to create a session in shared spaces for the collaborative web-based media-layered platform in a network environment.

The following description includes the best mode of carrying out the invention. The detailed description is made for the purpose of illustrating the general principles of the invention and should not be taken in a limiting sense. The scope of the invention is determined by reference to the claims. We assign each part, even if structurally identical to another part, a unique reference number wherever that part is shown in the drawing figures.

The present invention, relates to the field of collaborative computing, and more particularly, to a system and method for providing a browser-based program to create, and configure a shared space whereby multiple users can access this shared space to perform tasks and interact such as input, modify text and delete images, drawings and other multimedia via media-layers in a real-time synchronous manner. A shared space is defined as a virtual reference point whereas multiple users can interact in real-time upon shared objects. It is a conceptual construct created by processing executable machine codes from a plurality of programs or plug-ins typically using Flash Virtual Machine (VM) or Java VM. A session is defined as the state of all objects, GUI tools and controls, and media-layers, at any given time within the shared space. Each media-layer can serve as a container for shapes and objects as well as other programs such as a text editor, thumbnail viewer, MP3 player, games, etc. The invention also allows which media-layer(s) to display via organization metaphors and filtering criteria. The invention also allows for offline or unsynchronized interaction with objects of a session. Offline events are recorded for later integration with the session.

FIG. 1A depicts the basic foundation of the invention of system 100A to create a session 140 in shared spaces 140a to 140c for multiple users to collaborate on a web-based platform with created media-layers 141a to 141c within a network 112 environment. The shared spaces 140a to 140c emulate and share the contents of the session 140 where executable machine codes in both the client or user machines 130 to 134 and the host 102. The executable codes in each machine may be different, but the intended results of the invention are achieved. The system 100A is derived from four main components. Client or user machine(s) 130 to 134, host server 102, database 104, file storage 108 which is accessible through a web server 106. Each component may be on the same machine or separate machines. It is not necessary that each machine is of the same OS, nor CPU, type. The state of the session 140 is maintained on the host 102 during a live session 140 then the database 104 at the end of a session. All client or user machines 130 to 134 that are logged into a session 140 are constantly updated with changes to the session 140 in real time. If permissions are granted, any client can initiate a change to the state of the live session. Once this change has been sent, all client machines 130 to 134 are updated with the change.

The system 100A comprises of a host 102 in synchronous communication with one or more user machines 130 to 134. In an embodiment, the host is a server in communication with a database 104; where the host is also in communication with a web server 106 that communicates with a file storage 108. The database 104 can be in a separate server, or can be part of the host 102 within the same server 150. Similarly, the web server 106 and the file storage 108 can be separate units or can be integrated into a server 160. Yet in another embodiment, a host 170 is a server including the functions of the data base 104, the web server 106 and the file storage 108. The physical location of the database 104, file storage 108 and the method of writing the machine executable codes being integrated into the host server 102 is not important to the invention as long as the functions are accessible to the host 102 and to the user machines 130 to 134.

In an embodiment, each of the user machines 130 to 134 has an operating system 142a to 142c such as the Microsoft Windows XP®, Linux®, Macintosh OSX® or any third party operating system. The operating system in each of the user machines 130 to 134 need not be the same as long as it supports a web browser or other application to access the internet and supports the execution of codes to facilitate the intended media functions of the invention. In another embodiment, compiled Flash VM executable codes of the application 110 are downloaded before the creation of a shared space 140a to 140c to each of the user machines 130 to 134 from the host session 140 through the network 112 and links 124 to 128. Yet in another embodiment, the application 110 can be native to each of the user machines 130 to 134 as media applications 110a to 110c.

One or more media layers 141a to 141c are created and respective media tools are from media applications 110a to 110c is generated by the interaction of the codes in the user machines 130 to 134 and the codes from the host service 180 The network 112 and the corresponding links 114, 118, 120 to 128 are part of the Wide Area Networks (WAN), Local Area Network (LAN) through Ethernet connections or wireless connections. Yet in other embodiments, the network and the links can be Local Optical Networks (LON) or direct fiber optic links or direct terminal connections or plain old telephone service (POTS). In all forms of link communications within the network 112, the communications can be enhanced with known encryption protocols to improve security.

All services as contained within the host service 180 are equipment selected from the list to include a server, work station, personal computer, laptop computer, Personal Digital Assistant (PDA), an Intelligent Electronic Device (IED) or any suitable computing platform with sufficient memory and processing power to perform the functions as a server in a network environment. The user machines 130 to 134 are equipment selected from the list to include a server, work station, terminal, personal computer, lap top computer, Personal Digital Assistant (PDA), electronic tablet, handheld wireless device, a cellular phone, an Intelligent Electronic Device (IED) or any suitable computing platform with sufficient memory and processing power to perform the functions as a user machine to perform media inputs in a network environment.

Yet in others embodiments, the system 100A can be extended to include broad applications such as web conferencing, local conference presentations projecting synchronized annotations or pointing tool to contents on multiple screens to mass audience, on line interactive courses and tutoring, live interactive interviews to multiple interviewees in different geographical locations, interactive debate forums using multimedia, interactive cellular phone chats and games, secured synchronized interactive voting method combined with secured voter identification, live military battlefield operational command, remote interactive clinical instructions and operation training procedure; and electric power utility interactive service, support and trouble shooting etc. Said examples and the contents desired for the execution of said example can be assembled before and during synchronized events. Content can also be made available in an unsynchronized fashion such that independent content review or read only publishing can be supported.

Figure 1B:
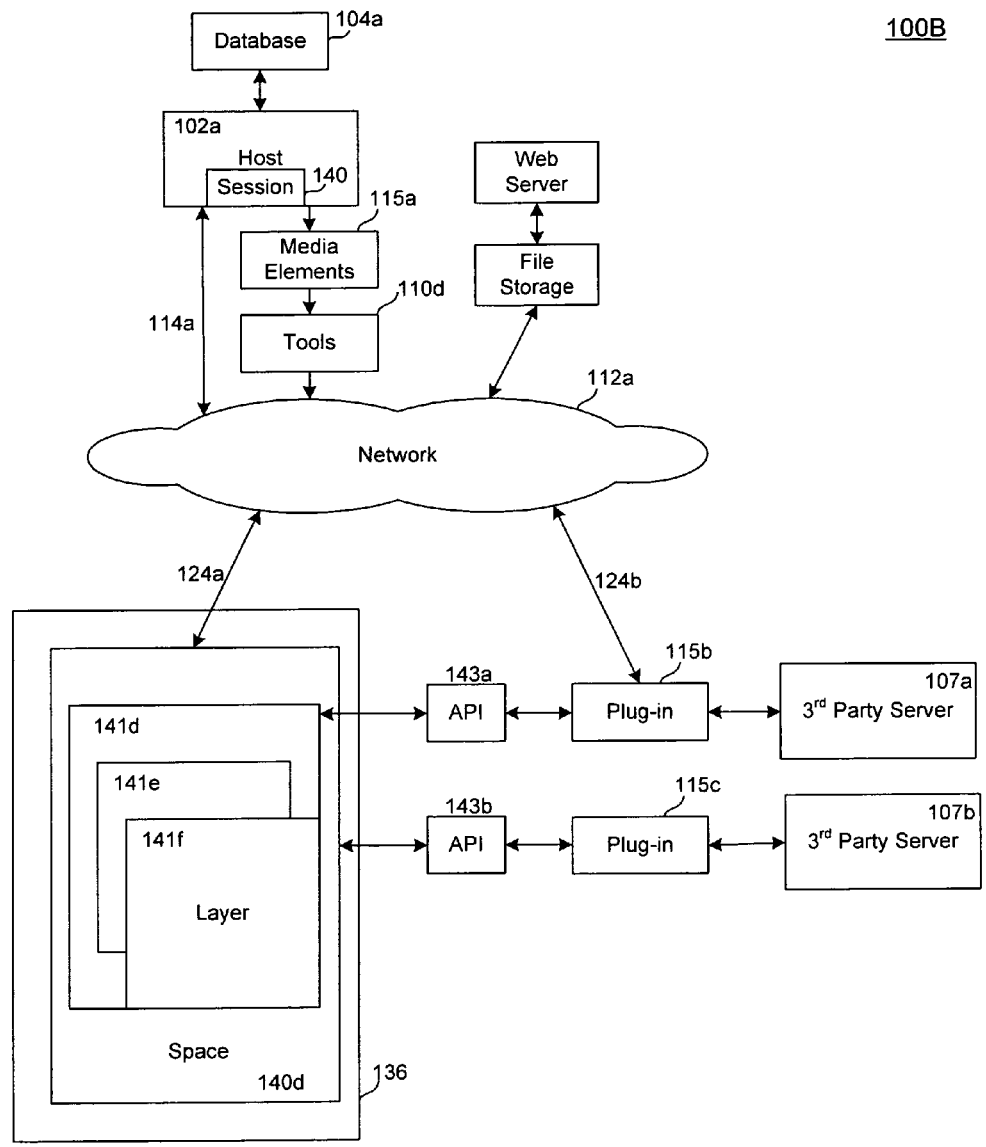
FIG. 1B illustrates the system initiation to create a session of collaboration in media-layers.

FIG. 1B illustrates the system 100B initiation to create a session 140 of collaboration in media-layered 141*d* to 141*f* within space 140*d* that holds media elements 115*a*, tools 110*d* (Flash application tools) or plug-ins 115*b* and 115*c*. Plug-ins 115*b* and 115*c* are independent applications that must conform to the system's API 143*a*, 143*b* as well as be compatible with the system's runtime environment. For example, if the client system is a macromedia Flash application, then the plug-in 115*b* and 115*c* must also be a Flash application. Said plug-ins 115*b* and 115*c* can be accessible either locally from the client machine 136, or through a local connection, or a network 112*a*. A plug-in 115*b* or 115*c* can, however, manage the execution of the tools of an application not of the same executable code base as the client application. For example, a Flash plug-in 115*b* or 115*c* can manage the execution of the Java application as relevant to the client machine 136.

In an embodiment, the initialization of the system 100B (in the synchronized state) requires that the user's or client's machine 136 has internet access through link 124*a* to network 112*a* and the ability to support compiled Flash based applications. A typical configuration will involve the use of a common web browser with a flash plug-in and JavaScript enabled. Through the use of a URL, the user or client makes a request to join a session 140 by sending login credentials to the host 102*a*. The host 102*a* in turn will query the database 104*a* to determine the tools 110*d* that must be downloaded and the current session 140 state parameters. In addition, plug-ins 115*b* and 115*c* are sometimes downloaded from third party servers 107*a* and 107*b*. Instruction and location of said plug-ins 115*b* and 115*c* are provided by the host 102*a*.

The host 102*a* first sends a base application that provides a synchronizing connection between that user 136 and the host 102*a*. A standard socket connection is established. Should this fail, High Ports are tested for the ability to exchange data. Should this fail, ports 80 and 81 are checked via standard HTTP protocols. Once a connection by links 114*a* and 124*a* from the user 136 to the host 102*a* has been established, the host 102*a* will send a list of required application tools 110*d* to be loaded by the user machine 136. By only loading those tools 110*d* that are required, the system in the user's machine 136 will start faster with a lower memory requirement. Should the user choose to run in 'thin' mode, those tools 110*d* that are only needed on demand will be loaded into memory during their use and unloaded after their use is no longer required.

FIG. 1C1 is an embodiment of a system 100C illustrating the process of establishing and operating a session within a user application such as a web browser 140*j* using various tools in Flash application 110*e*. When a user 135 logs onto the system 100C via the internet, LAN or WAN 112*b*, the user 135 is registered in a shared virtual environment (session 140*k*) based on user's credentials and other parameters supplied at log on. In this exemplary example, the flash application 110*e* is loaded on to the client's machine 135 by the client's web browser 140*j*. This flash application 110*e* in turn, loads a communication synchronizer application 113 that contacts the Host's server synchronization service 102*d* and requests to be registered with a particular shared space for a session. Once this connection has been established, all communication between the client application 110*e* and the host sync service 102*d* happen between these two applications.

Based on user credentials and other parameters supplied, a list of tools and their location(s) on the file storage server(s) 108*a* is generated. This list is passed to the flash application 110*e*. The flash application 110*e* then loads a stage manager tool 1100*b* into the buffer memory from the web server 106*a*. This tool 1100*b* creates and manages the stage 1102*b*. Once this is done, the flash application 110*e* then sends a message back to the file storage server 108*a* via sync application 113.

One of the tools that are loaded is the stage manager 1100*b*. This tool 1100*b*, once loaded, looks at the attribute list of the current room for the session. One item on that list is the type of layout to be used on the stage. If any other layout is defined besides 'default', additional tools 1104*b* are downloaded to support the additional features. The stage manager 1100*b* is then provided a list of media-layers 1108*b* to 1112*b*. Those media-layers that are listed as 'active' should be currently displayed. Active media-layers 1108*b* and 1112*b* are accessed, loaded and displayed on the stage 1102*b*. Once complete, non-active media-layer(s) 1110*b* are downloaded and stored in cache memory in a prescribed order if this option was selected. All of the media-layers together, both loaded and unloaded, 1108*b* to 1112*b* are called a 'collection'.

The relationship of all media-layers 1108*b* to 1112*b* to each other can be stored in an XML file known as the 'collection'. The most exemplary example is the default stage manager system where all media-layers are displayed using the Cartesian coordinate system where the y axis is inverted. An example XML collection file follows:

---

...
<collection type='book_simple' label='my book' authorID= '23jkl4johnsmith' ...>
    <tools>
        <page_navigator pluginRef="../plugins/book_nav.swf"/>
        <page_thumbnail_viewer pluginRef= "../plugins/thumb_view.swf"/>
        ...
    <tools/>
    <layer ID='a' label='title page' parent='top' z=0...>
        <children 0='b'/>

-continued

```
    ...
    <layer/>
<layer ID='b' label='title page' parent='a' z=1 ...>
    <...
...
```

The stage manager tool 1100b then checks to see what type of collection has been loaded. In this case, it is a 'book_simple' type collection. The tools 1104b required for this type of layout is listed in the 'tools' section of the XML. The client flash application 110e then downloads into memory those tools 1104b listed.

FIG. 1C2 illustrates another embodiment of various components of the Flash application 110e interacting with the user's media-layers 1108 to 1112 on the stage 1102. Although there are a number of possible combinations of tools that can be loaded, the one tool that is always loaded is the stage manager 1100. The stage manager tool 1100, among other things, established the coordinate system and layout format that will be populated by media-layers 1108 to 1112. The most typical configuration of the stage 1102 is a two dimensional cardinal system where 0,0 is located on the upper left most side of the application window placed just under the displays for session and user information and controls. These controls are typically displayed at the top of the application window. The list of active media-layers 1108, 1112 are passed to the stage manager 1100. The media-layers 1108 and 1112 that are tagged as 'visible' are loaded first and then displayed in a stage 1102.

A media-layer is a container that serves as a reference point for media as well as other media-layers. Since media-layers 1108, 1110 can be attached to another media-layer 1112, nesting of media-layers can occur. For example, a 'parent' media-layer 1112 contains an image of a human face on it. A 'child' media-layer 1110 is nested on top with a mustache drawn over the face, and another 'child' media-layer 1108 is nested on top with eye glasses drawn. When the parent media-layer's 1112 object is moved or hidden, the two child media-layer's 1110 1108 objects will also move or be hidden, thus maintaining their visual relationship. Each child however can have its visibility setting changed by a parent or another media-layer in the patriarchy. A media-layer from outside the patriarchy cannot modify a media-layer unless such functionality is support by the system's API.

Figure 1D:
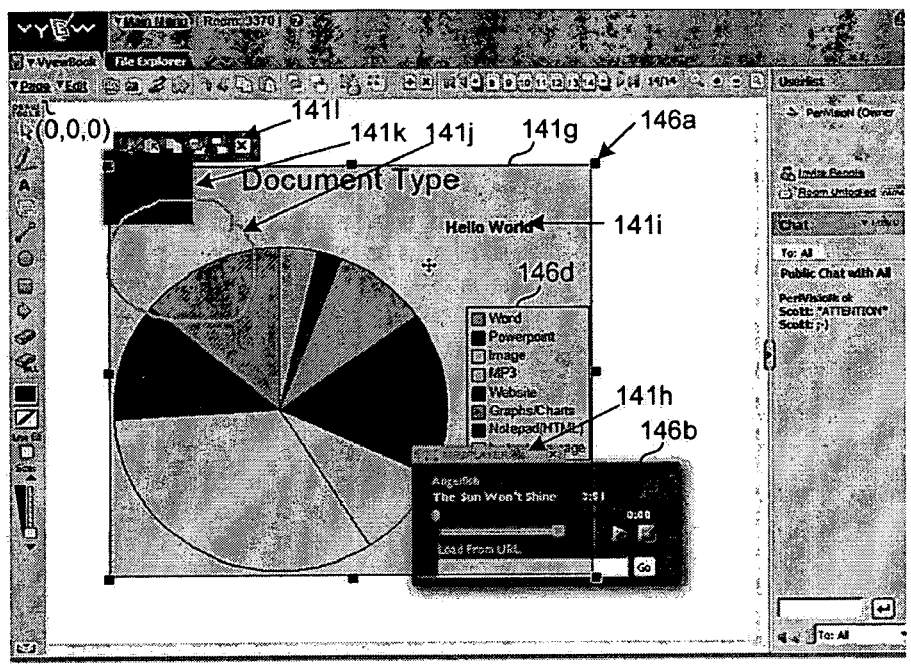
FIG. 1D is a screen shot illustrating the construct of a page as a collection of media-layers in a Book metaphor.

A screen shot is taken from the product Vyew® in FIG. 1D to illustrate the construct of a page 140h. In FIG. 1D, page 140h is a collection of media-layers 141g to 141k (in the drawing changes 146b to 141h). A media-layer such as 141h is a container to execute the codes of an application or a plug-in. For example, media-layer 141h contains a plug-in 146b (in drawing changes 141h to 146b) where a plurality of media objects can be executed, such as 146b to execute an mp3 music player in the media-layer 141h. Another example, media-layer 141g is a gif image which is currently selected. It has the ability to render bitmaps and vector information (images or animations) directly to the display. Media-layers can also display other compliant applications. The scale and position of a media layer 141g can be modified by using tool 146a which is part of toolset 1411 within the page 140h. Each of the media layers 141g to 141k is referenced to a space coordinate origin of (0,0,0) at the upper left corner of the page 140h. The attributes of the media-layers 141g to 141k are referenced in a collection file descriptor such as in a XML file.

Figure 1E:
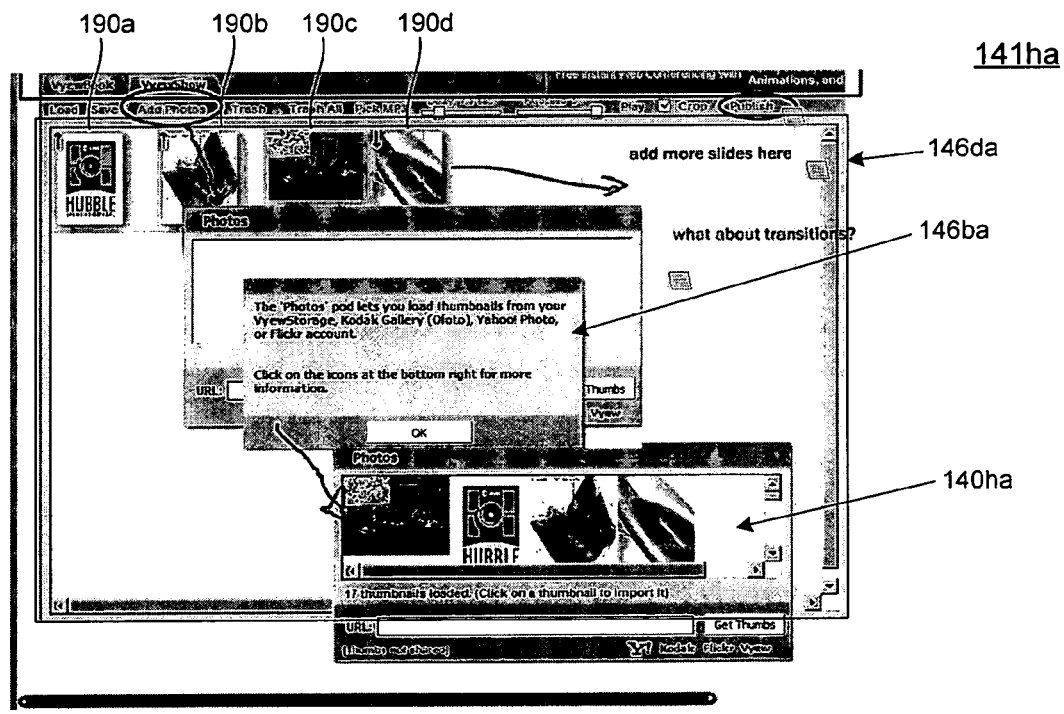
FIG. 1E illustrates an example of a media-layer as a container for an application or plug-in to create media object elements within the media-layer.

FIG. 1E further illustrates another example of a media-layer 141ha as a container to a media application or thumbnail viewer plug-in 146da creating a plurality of media objects within a media-layer 141ha. For example the thumbnail viewer plug-in 146da is referenced on a media-layer. Once this plug-in 146da had been initialized, a popup tool 146ba will assist the user in configuring the plug-in 146da. In this example; how to access images 190a to 190d that are stored on a third party server. The user selects a set of images from the third party server 140ha. Those images 190a to 190d are then place in new media-layer(s) or a reference of these images 190a to 190d are passed to the thumbnail viewer 146d via the systems API set shown in FIG. 1B.

FIGS. 1F and 1F1 illustrate the construct of a Book metaphor using media-layers created and managed by tools 1116c. After the stage manager 1100c invokes the book metaphor toolset 1116c, a media-layer 144a labeled as 'cover' 144a of a book image 144b is loaded into a tool 116c that supports the book metaphor.

Another media-layer 141m could then be created as a page. The media layer of the page 141m holds object elements such as a graphic of paper texture 140d. This media-layer of page 141m would be set as a child to the media-layer of the book 144a as well as have the attribute of 'page=2' 145a. A third media-layer 141n would contain an image and this media-layer 141n will have a Z value of "1" placing it over the page 141m media-layer and then set as a child to this page 141m media-layer. Other media-layers 141p with annotation and media can be added as children to either the page 141m media-layer or one of the media-layers 141n that has been already set as a child to the page 141m media-layer. When the book 144a media-layer is displayed on the stage (not shown), the other children media-layers 141m to 141p would be hidden. When the user 'opens' the book 144a, the cover 144b media-layer would hide and the page 141m media-layer with its children and subsequent generations 141n, 1441p would appear. Because we are employing a book metaphor 144a, tools 1116c of FIG. F1 would be provided to the user that would assist in the visibility, ordering and the setting of relationships between media-layers 144a, 144b, 141m to 141p. The user would not know about child or parent or media-layers, only that they created a book 144a, and that they can add pages, and then add content to those pages. In another example, other metaphors not shown could be one of a 2.5D environment where media-layers are expressed as 2D planes intermixed with 2.5D objects. A set of such as six media-layers can be set as children to a parent media-layer thus creating a cube for the 2.5D environment. These metaphors are supported with graphics that support the navigation and ordering of the multimedia elements that appear on each media-layer. Since all media is displayed using media-layers and all media-layers can have their visibility, stacking order, position, relationships, etc. modified; then various tools and GUI (Graphical User Interface) elements in the menu tool bars can be created to managed these attributes in a more user friendly method. Typically, metaphors that humans are familiar with are used.

The issue of concurrent users in making an annotation to the media layer is addressed next. Unique to this invention is that ability to share in real-time, near real-time as well as maintaining persistence, the ability to create, modify and delete media-layers and the media elements associated with those media-layers and regulate access to those media-layers. In addition, all tools and User Interface (UI) elements can be controlled at runtime based on commands from the stage manager. As such, not all users logged into a shared space will see that same thing if such modifications are selected. For example, the administrator of the shared space may wish to have all the tools made available to him or her. However, all other users who are of type 'guest' will not see any tools. Those users who are of type='invited' may see only a subset of tools that the administrator sees.

When a user is logged into the system, actions that are performed on the media or changes to the media-layer's attributes are tracked and sent to the server. The server maintains a log of the actions and the resulting status of media-layers and their media. The server then repeats the actions to all users who are logged into the same session. When users enter in to a session, they immediately load all active media-layers, media and plug-ins. In this way, every user who is logged into the system has a copy of the media elements and only has to execute the actions that were sent by the server. Since all users can (if allowed by the administrator) have their action communicated back to the server, everyone's actions within the space is reflected on the display of all concurrent users. If the administer allows more then one user access to a media-layer, then only one action may occur at one time within a media-layer. In other words, if a user initiates an action, no other actions can take place until the first action is complete. Concurrent actions can occur on separate media-layers. The administrator can selected that all actions on media-layers are NOT locked. This means that if two users click on the same media-layers media, then whomever's event is sent last, will have said event respected unless the object is deleted or somehow unable to execute the later event.

A whiteboard tools perform the unique function of creating a new media-layer every time a line is started and then stopped. Each line and/or shape in the whiteboard tool library is treated like an individual object on its own media-layer.

For whatever metaphor employed, the information required to create and support an ordering construct is managed by the stage manager. All rights to what media-layers and tools are loaded, seen and how they function is controlled by the user or administrator who created the space (account). The administrator can pass the rights of a media-layers and tools to anyone(s) or to everyone.

Figure 1G:
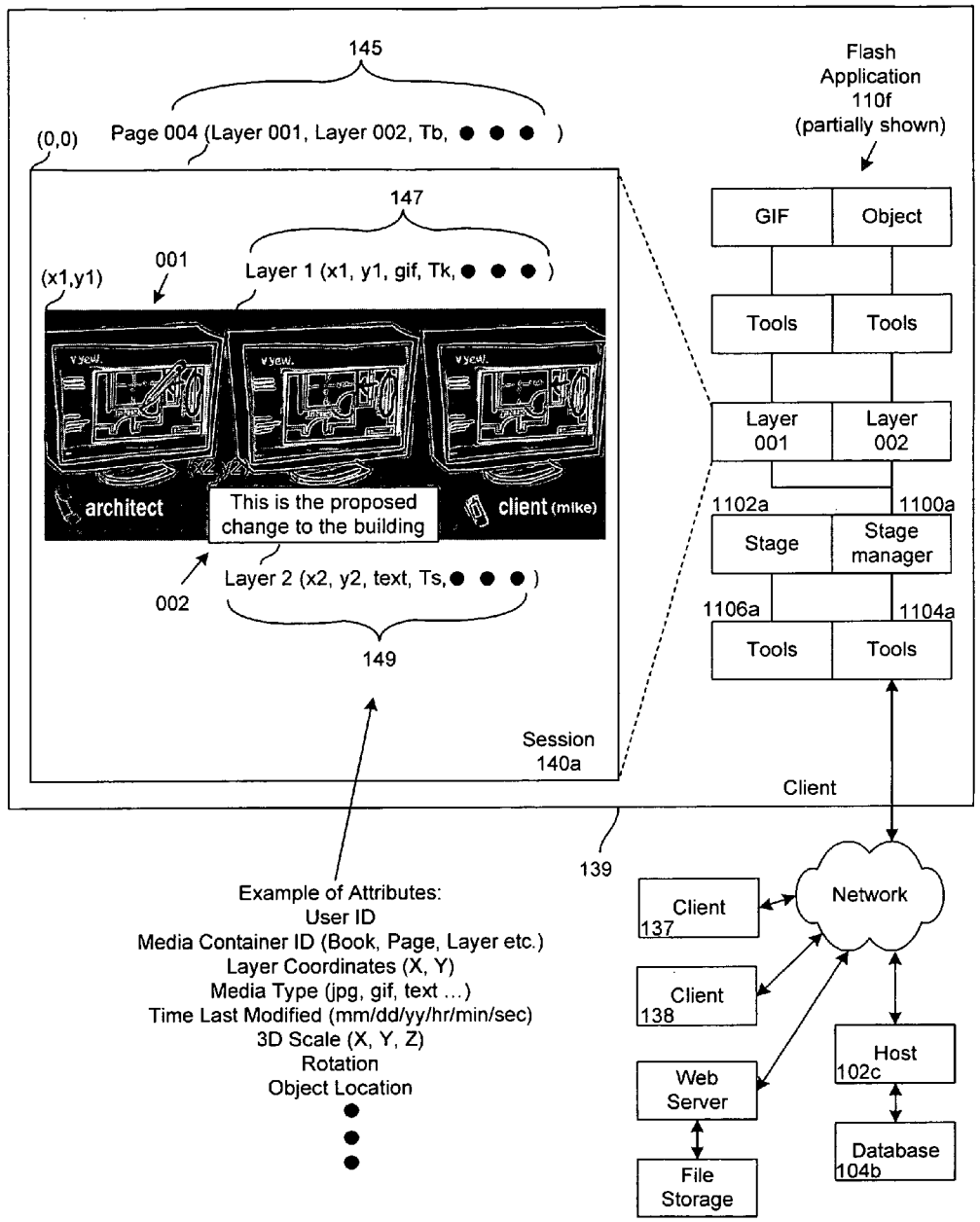
FIG. 1G illustrates an example of staging and synchronizing media-layers using a Flash application tool for the construct of a page as a collection of media-layers.

FIG. 1G illustrates an example of staging and synchronizing media layers using a Flash application tool for the construct of a page 004 as a collection of media-layers 001 and 002. Each media-layer 001 or 002 has attached to it, a set of corresponding attributes 147 or 149 that inform the stage manager 1100a also shown as 1100b in FIG. 1C1 on how to manage a respective media-layer. For example, media-layers with the media-layer ID 001 and 002 respectively have been placed on the stage 1102a of a Flash application 110f to be displayed. Media-layer 001 may have the following attributes: Layer ID (001), Position X1 (30), Position Y1 (30), Position Z (0), Scale in X (100), Scale in Y (100), Scale in Z (100), Rotation (0), location of media object (..//arch_exmpl.jpg), type of media object (image), Date Created (some date), Date last modified (some date), Date deleted (some date), ID of the user that created this layer (jones43), etc. From this information, the stage manager will know to load a jpg image from a given location and display that image, unaltered 30 units to the right and 30 units down. Media-layer 002 may have the similar attributes with Position X as (40), Position Y (40) and Position Z (1). In this case, the text field would appear within the application with the image in media-layer 001 under the text of media-layer 002. If another user with a client machine 137 or 138 accesses this same session, then the same steps will repeat, thus assuring that both client machines 137 and 138 are displaying the same thing.

Interacting with media-layers in a synchronized mode is discussed next. The stage manager tool 1100a of the system insures that all changes in state of a media-layer or actions that are passed to the media-layer from that media-layer's contents, is communicated to the host server 102c to either be recorded, or sent to some or all of the other client machines 137 and 138. This is accomplished by the host server 102c maintaining a list of all subscribed client machines 137 to 139. As an event is received from a client machine 139, that event is logged and stored either on the host server 102c and/or on the database 104b. This event is then passed to the rest of the client machines 137, 138 on the subscriber list. The event is then replicated on all client machines 137, 138, however, in rare cases, an exception rule can intercept the event and then follow a defined action which may or may not mimic the original event. For example, a client machine 137 may click on an object in a media-layer 002 thus making that object interactive. The client 137 then moves the object 002 from one location to another, thus creating an event. The changed media-layer attribute 149 information, in this case Position X, Position Y, Date last modified, to the host server 102c as an event. The host server 102c records this new information and then sends this event information to all subscribed client machines 137 to 139. Users on the client machines 137 to 139 would then see the same object from the original location to the new location as indicated by the terms of the event.

Figure 2A:
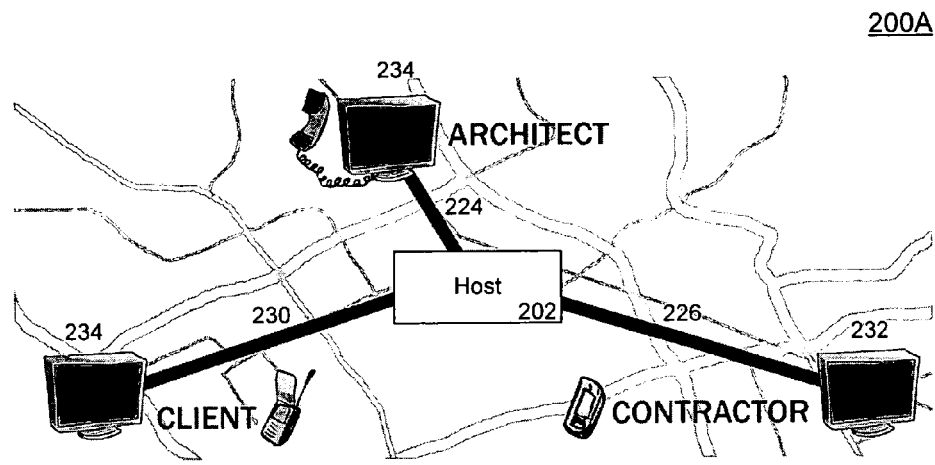
FIG. 2A illustrates an example of collaborative actions in a web conferencing environment.

FIG. 2A illustrates an example of collaborative actions in a web conferencing environment 200A. Users 230 Client, 232 Contractor and 234 Architect hold a teleconference in separate geographical locations. A virtual shared space is created when users 230 to 234 are logged into a common session through synchronous communication links 224 to 228 with host server 202.

Figure 2B:
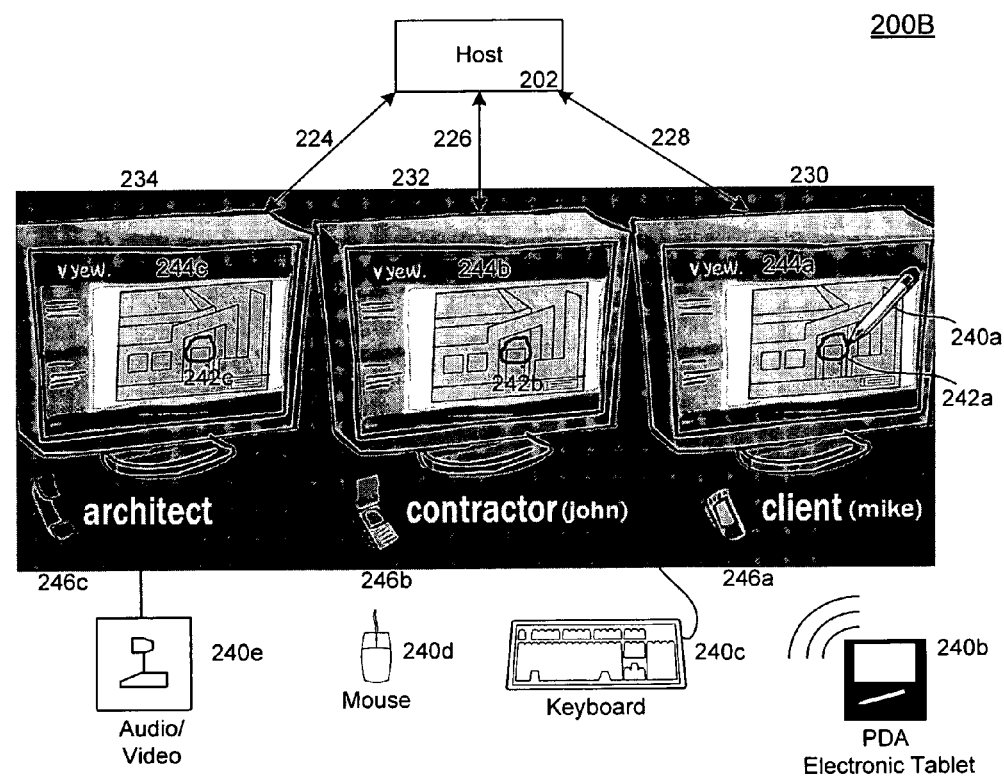
FIG. 2B illustrates an example of synchronizing an annotation of a drawing in a shared space through various input devices.

FIG. 2B illustrates an example of synchronizing an annotation of a drawing in a shared virtual space 244a to 244c through various input devices 240a to 240e during a web conferencing environment 200B. In an embodiment, the shared space 244a to 244c is a web-based shared environment such as a web browser where multiple users 230 to 234 can create, transform and delete a wide variety of media as well as annotate over or under said media. The example in FIG. 2B illustrates that user 230 as client Mike annotating a circle 242a over an image of a floor plan displayed on the computer monitor using an electronic or optical pen 240a. This action is synchronized and displayed on those sharing the same virtual space 244b as 244c in user 232 contractor John and user 234 Architect's computer monitors. All actions from any of the users 230 to 234 are also stored on the server 202 for later retrieval. If users 230 to 234 annotate the floor plan drawing at same location at the same time, the last input to the shared space 244a to 244c will be recorded and shown on the computer monitors.

Alternately, other input devices such as but not limited to a wireless PDA or electronic tablet 240a, a keyboard 240c, a mouse 240d, optical pointer, USB flash memory, stylus, audio or video equipment 240e such as a video camera or microphone or both can also be sent as inputs to the shared space 244a to 244c. The cellular phones 246a to 246c voice input can be integrated as a media layer over the other text or graphic layers during the teleconferencing.

The shared environment is multi dimensional thus allowing users 230 to 234 to sort information by not only content, but spatial, temporal and inter relationships between the media-layers created. Because the shared spaces 244a to 244c is virtual and not restricted to one image, more then one media can be placed within the same shared spaces 244a to 244c.

FIG. 3A to 3E are various browser screenshots 300A to 300F of a Graphical User Interface (GUI) illustrating a plurality of executable tool functions including the stage manager tools available for the collaborative media-layered platform. In an embodiment, the GUI shown in FIG. 3A includes standard windows editing tools 304a. The shared media workspace 310 acts as a container to support a plurality of media file formats and plug-in applications where layer-based authoring content can be easily moved, scaled, copied, pasted, layered and deleted. On-demand access to different content or sessions—saved and organized by topic, audience or version for example. A user list 306 and chat configurations 308 are also shown. Some examples include the Microsoft Office® and Adobe® PDF files, real time desktop sharing, photos, etc. shared media workspace 310 can import and export (to PowerPoint or PDF) for asynchronous work or archiving offline. Operation and UI of the client application in an offline mode is similar. This characteristic allows the user to continue annotating the media layer objects when offline (temporarily leaving the session), re-synching to the latest changes on the media layer or to the session when back online. The time and space synchronization of content changes and annotations enable users to publish content anywhere on the web, have presence awareness capabilities to know when other users are interacting with that content, and then interact with that user in real-time.

Figure 3A:
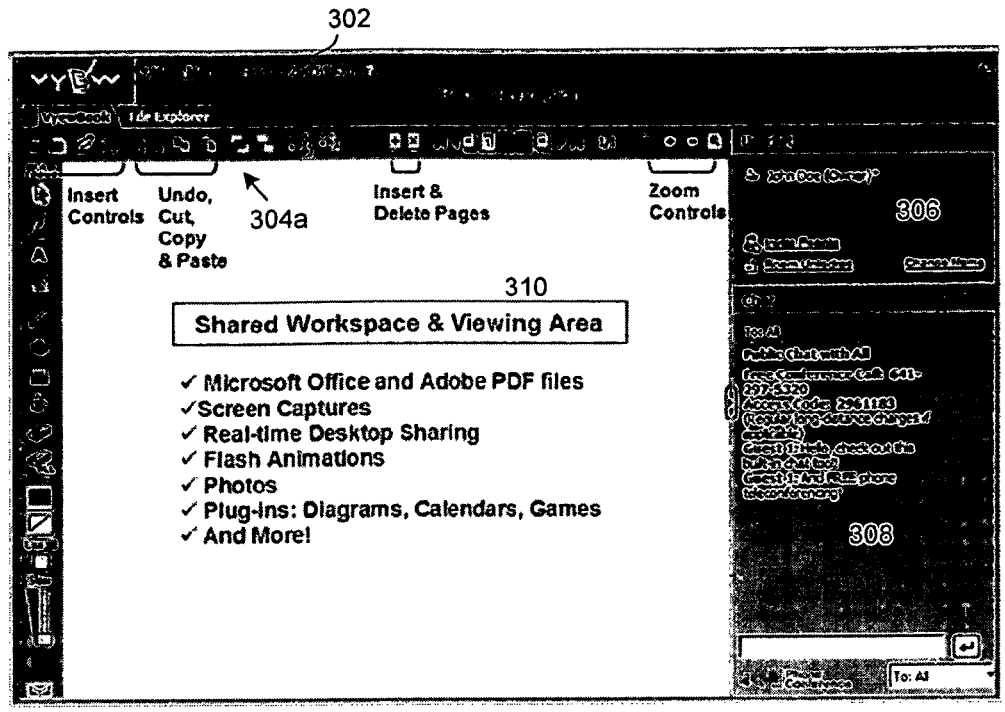
FIGS. 3A to 3F depicts various functions and features of the invention in creating a collaborative multimedia platform.
Figure 3B:
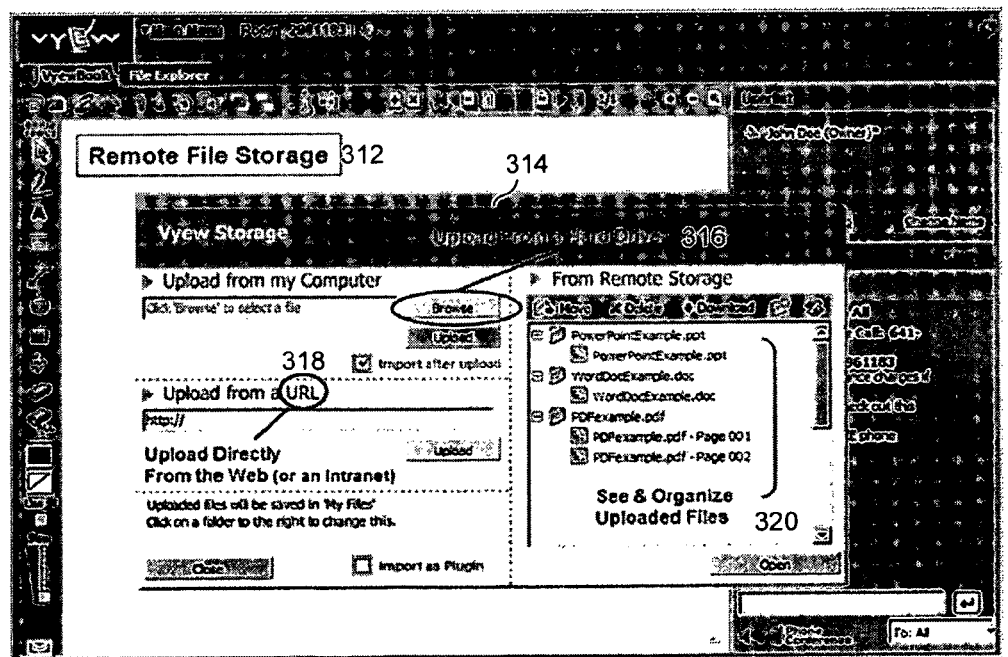
Figure 3C:
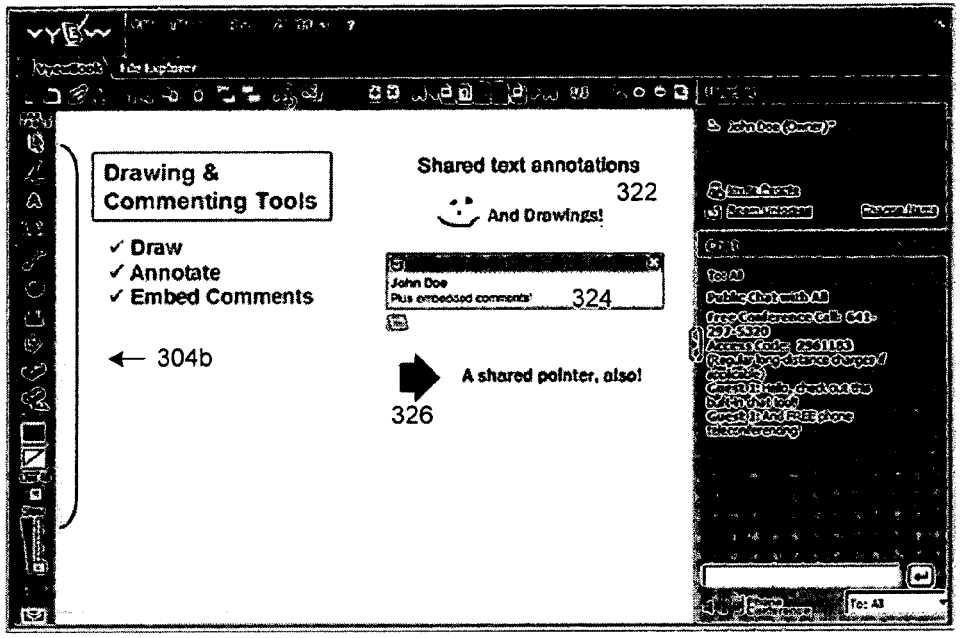
Figure 3D:
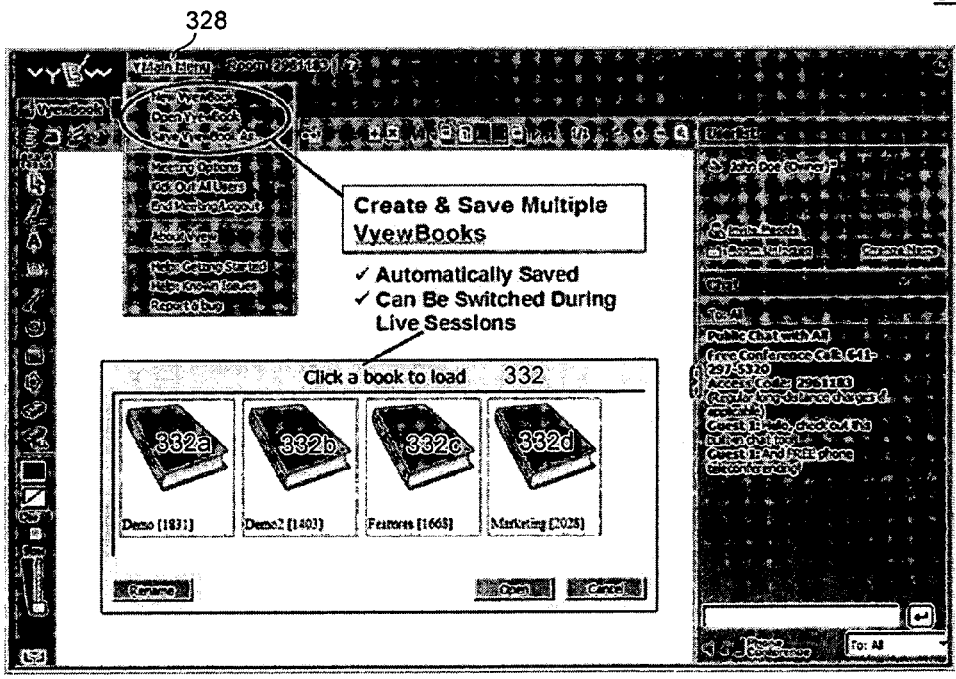

FIG. 3B illustrates another window opened from the tool bar where the upload of files from a file storage remotely 318 or locally from a hard drive 316. For remote locations, files can be uploaded directly by providing a valid URL. A tree structure 320 shows the organization of the files through a web service 106a from a remote file storage 108a such as one shown in FIG. 1C1 or from the local hard drive 316 or other storage devices accessible from a client machine. In FIG. 3C, new media 322 and text 324 can be created as new media-layers using the tools 304b. 326 shows a shared pointer object that maintains its position across all clients in real-time functioning as a surrogate mouse pointer. FIG. 3D illustrates GUI tools invoked to support the book typical metaphor. Using the main menu 328 to open, create or save a collection, illustrated here as a 'book' to be shared and viewed by the users in the session. Books 332a to 332d can be switched during a session by the users.

Figure 3E:
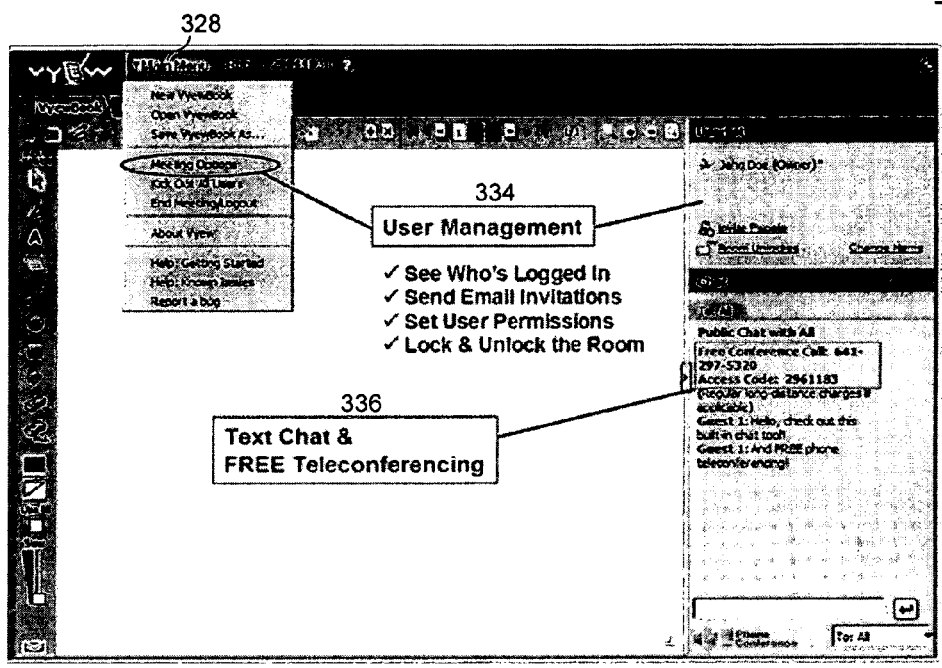
Figure 3F:
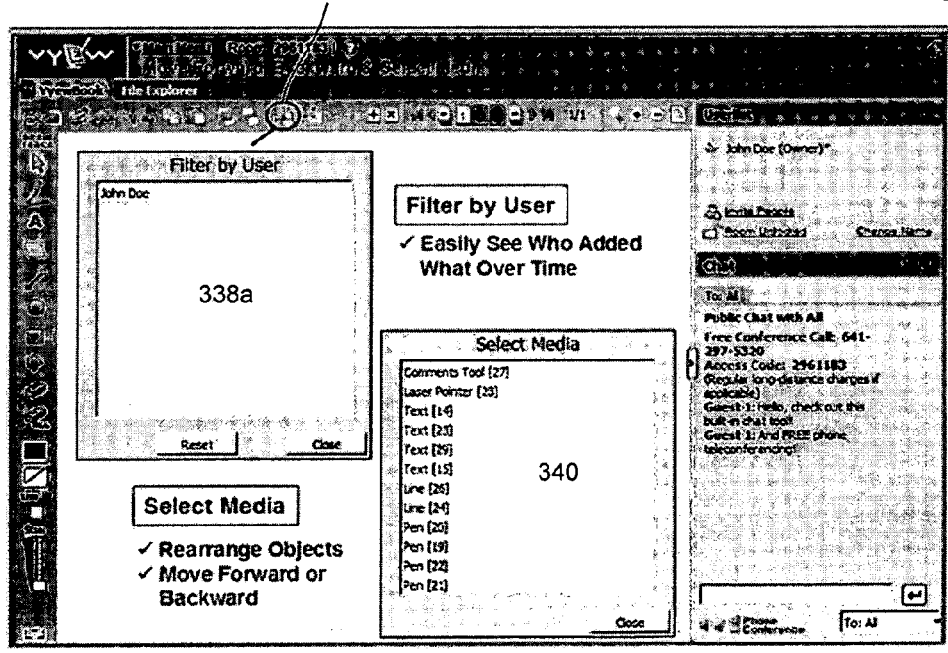

FIG. 3E illustrates the user management 334 function can be invoked by selecting meeting option from the main menu tool bar 328. The user management function allows user see who is logged in, send email invitations, set user permissions, lock and unlock the room for the shared session. The option of using teleconferencing 336 by using online VOIP (Voice Over IP), cell or common POTS while interacting in real time with users during the session can be done by providing an VOIP client or phone number and access code for those users given permission to access said voice service. FIG. 3F illustrates a 'filter by user' tool 338 where a window 338a is opened to display the ID labels (name) of all users that have created a media-layer on the current page. Objects can be hidden or unhidden based on the selection of one or more names. This same filtering is also achieved based on the time from of when media-layers were created and/or modified. Another select media window 340 allows the selection of media-layers based on the media-layer's ID label.

Figure 4:
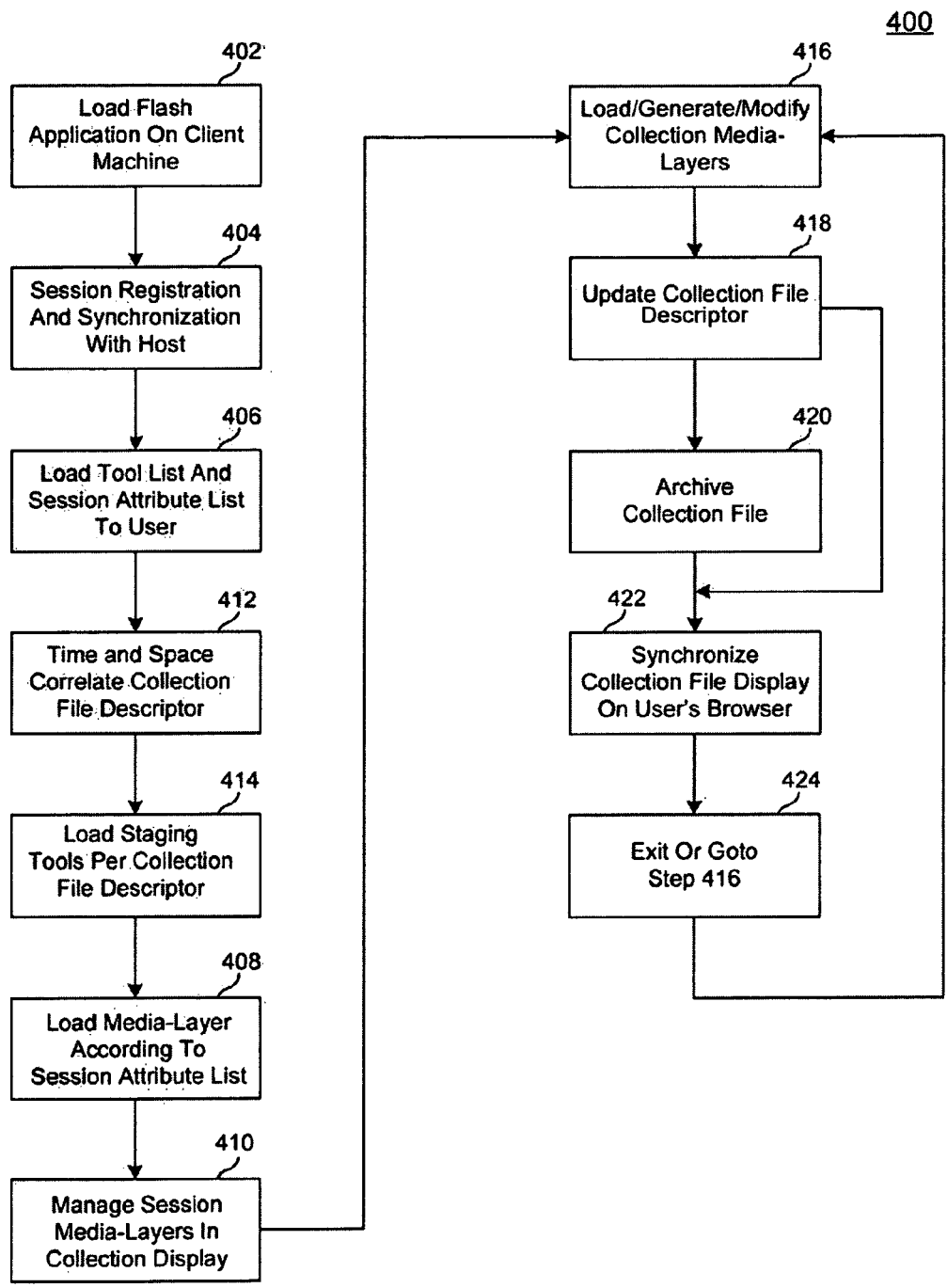
FIG. 4 is a flow chart depicting a method to collaborate a web browser based media-layered session in a network environment.

FIG. 4 is a flow chart 400 depicting a method to collaborate a web browser based media-layered session between two or more users in a shared environment. In an embodiment, the shared environment is an Ethernet WAN or LAN network, a fiber optic communication direct link, a Flash application is loaded on each registered client machine in step 402. In step 404 the flash application on the client machine connect to a host server after being authenticated. The host registers the users and opens a session to support synchronous communication. In step 406, the host retrieves from a database the identity of user and sends a tool list to be loaded by the flash application on the client. In step 412, the collection is correlated with information including time last modified and 3D space coordinates into a file desciptor suitable for network equipment communication such as an XML file. In step 414, the user web browser loads staging tools from the stage manager according to the user's collection file descriptor received. The collection file descriptor can be a file from a remote file storage location or from the user's local hard drive. If no particular format is specified, the staging tool will load one or more default media-layers for the session. In step 408, the flash application will load one or more media-layers in response to the receipt of a session attribute list from the host. If no specific attribute is specified, a default media-layer is loaded. One of such tools is the stage manager tool. In step 410 a plurality of media-layers form a collection; where the collection is managed by the stage manager tool, only the active layers are viewable by users, the inactive layers are hidden from view. In step 416, the user can load an existing file with a collection of media-layers from a remote location on the web by specifying URL address or from a local hard drive. The user can also generate new or modify the loaded media-layers. In step 418, the modifications of user's inputs include annotation, delete, insert, copying, pasting or drawing to the media-layers are updated to file descriptor. The updated collection file descriptor can be stored for later retrieval by the users in step 420, or can be accessed by other users logged in the same session in step 422. In step 424, if all tools and media-layers loads are completed, the process ends until further inputs from any of the users in the session.

What is claimed:

1. A method to collaborate and interact multimedia tasks in a shared space within a network comprising the steps of: loading a media application with a plurality of tools into a users application in a user machine; logging in from the user machine to a shared space in a network from the user application to a host, wherein the shared space is created by interaction of executable codes in the host and the user application and the shared space is described by a session attribute list; loading a tool list from a file storage to activate corresponding tools from the media application; using a stage manager tool from the media application to stage to order and correlate a plurality of visual media-layers relative to a parent media-layer according to nonlinear spatial and relational coordinate data in the user application, wherein the stage manager tool further includes filtering designated media-layers to restrict viewing by the user; wherein the media-layers data are described by a file descriptor; inputting multimedia elements as media-layer modifications and updating the modifications in the file descriptor; and displaying the updated modifications by other user machines in the shared space in synchronous or asynchronous mode.

2. The method of claim 1, wherein the media application is a flash application, Java application or browser based scripts.

3. The method of claim 1, wherein the step of logging in includes the step of accessing to an internet service.

4. The method of claim 1, wherein the network is an Ethernet connection to a local area network, a wide area network, a local optical network, a fiber channel, a direct connection or a telephone service.

5. The method of claim 1 further comprising the step of the host communicating to a database to retrieve a user's session attribute list 6. The method of claim 1, wherein the stage manager tool manages the viewing or hiding of the media-layers in the user application.

7. The method of claim 1, wherein the user application is a web browser installed on a user's machine capable of accessing to a network.

8. The method of claim 1, wherein the user machine includes a server, personal computer, laptop computer, hand held computer, personal digital device, electronic tablet, a wireless cellular phone, an intelligent electronic device.

9. The method of claim 1, wherein the media application is a plug-in for text, voice, video or graphic application.

10. The method of claim 1, wherein the stage manager allows a user to sort information by content, spatial, temporal and inter relationships between media-layers.

11. The method of claim 1, wherein the stage manager tool further comprising the step of grouping collections of media-layers into a book metaphor.

12. The method of claim 1, wherein the file descriptor is a XML file.

13. The method of claim 1, wherein the inputting step is are facilitated by an input device selected from a keyboard, mouse, soft key, electronic tablet, PDA, cellular phone, USB flash memory, optical pointer, stylus, pen, audio or video device.

14. A system to collaborate and perform multimedia task inputs in a shared space within a network comprising: a host server that communicates to a database and a file storage through a network; a user machine with a user application that logs to the host server to join a shared space session with other user machines running user applications, wherein the shared space session is generated by interaction of executable codes in the host and the user application and the shared space session is described by a session attribute list; a media application with a plurality of tools loaded into the user machine; the host server loading a tool list and the session attribute list loaded into the user application, wherein the tool list activates a stage manager tool from the media application; the stage manager tool that stages one or more media-layers according to the session attribute list into the user application and the stage manager orders and correlates a plurality of visual media-layers relative to a parent media-layer based upon nonlinear spatial and relational coordinates data of the media-layers into a file descriptor; a user provides collaborations, multimedia modifications and inputs to the media-layers wherein the stage manager updates the modifications to the file descriptor; and wherein the stage manager tool further includes a filtering tool for designated media-layers to restrict viewing by the user; and wherein the stage manager facilitates the display of media- layer updates to other users in the shared space in synchronous or asynchronous mode.

15. The system of claim 14, wherein the media application is a flash application, Java application or browser based scripts.

16. The system of claim 14, wherein the user application is a web browser that logs into the host through an internet service.

17. The system of claim 14, wherein the network is an Ethernet connection to a local area network, a wide area network, a local optical network, a fiber channel, a direct connection or a telephone service.

18. The system of claim 14 further comprising a web server with a file storage communicating tool list to the web browser to the user through the network.

19. The system of claim 14, wherein the stage manager tool manages the viewing or hiding of the media-layers in the web browser.

20. The system of claim 14, wherein the user include a server, personal computer, laptop computer, hand held computer, personal digital device, electronic tablet, a wireless cellular phone, an intelligent electronic device.

21. The system of claim 14, wherein the media application is a plug-in for text, voice, video or graphic application.

22. The system of claim 14, wherein the stage manager tool allows a user to sort information by content, spatial, temporal and inter relationships between media-layers.

23. The system of claim 14 further comprising a filtering tool to restrict viewing of designated media-layers by other users.

24. The system of claim 14, wherein the file descriptor is a XML file.

25. The system of claim 14, wherein the inputs are facilitated by an input device selected from a keyboard, mouse, soft key, electronic tablet PDA, cellular phone, USB flash memory, optical pointer, stylus, pen, audio or video device.

26. A method to collaborate and interact multimedia tasks in a shared space within a network comprising the steps of: loading a media application with a plurality of tools into a user's application in-a-user machine; logging in from the user machine to a shared space in a network from the user application to a host, wherein the shared space is created by interaction of executable codes in the host and the user application; and the shared space is described by a session attribute list; loading a tool list from a file storage to activate corresponding tools from the media application; using a stage manager tool from the media application to stage, to order, visible or hidden and to correlate a plurality of visual media-layers relative to a parent media-layer according to nonlinear spatial and relational coordinate data in the media-layer, and wherein the stage manager tool further includes filtering designated media-layers to restrict viewing by the user, wherein the media-layers' data are described by a file descriptor users can modify, add or delete media-layers, and these changes are sent to a server which stores updated data and send updated data to other user machines in the shared space in synchronous or asynchronous mode.

* * * * *